(12) United States Patent
Crafton (10) Patent No.: US 9,990,586 B2
(45) Date of Patent: Jun. 5, 2018

(54) SYSTEM AND METHOD FOR ANALYZING AND VALIDATING OIL AND GAS WELL PRODUCTION DATA

(71) Applicant: James W. Crafton, Evergreen, CO (US)

(72) Inventor: James W. Crafton, Evergreen, CO (US)

(*) Notice: Subject to any disclaimer, the term of this patent is extended or adjusted under 35 U.S.C. 154(b) by 0 days. days.

(21) Appl. No.: 15/431,405

(22) Filed: Feb. 13, 2017

(65) Prior Publication Data

US 2017/0154278 A1    Jun. 1, 2017

Related U.S. Application Data

(63) Continuation of application No. 14/257,621, filed on Apr. 21, 2014, now Pat. No. 9,569,521.

(60) Provisional application No. 61/901,948, filed on Nov. 8, 2013.

(51) Int. Cl.
*G06F 17/00* (2006.01)
*G06N 7/00* (2006.01)

(52) U.S. Cl.
CPC .................................. *G06N 7/005* (2013.01)

(58) Field of Classification Search
CPC ...... G06F 17/5009; G06F 19/18; G06F 17/10; G06F 19/14; G06F 19/34; G06F 19/3418
See application file for complete search history.

(56) References Cited

U.S. PATENT DOCUMENTS

| | | | |
|---|---|---|---|
| 4,260,019 A | 4/1981 | Blair, Jr. | |
| 4,460,627 A | 7/1984 | Weaver et al. | |
| 5,992,519 A | 11/1999 | Ramakrishnan et al. | |
| 6,266,619 B1 | 7/2001 | Thomas et al. | |
| 6,637,517 B2 | 10/2003 | Samuel et al. | |
| 6,957,577 B1 | 10/2005 | Firmin | |
| 6,980,940 B1 | 12/2005 | Gurpinar et al. | |

(Continued)

FOREIGN PATENT DOCUMENTS

WO    2011025471    3/2011

OTHER PUBLICATIONS

V. Barragan-Hernandez, et al., "A Strategy for Simulation and Optimization of Gas and Oil Production," Computers and Chemical Engineers, 2005, pp. 215-227, vol. 30, Elsevier Ltd.

(Continued)

*Primary Examiner* — Truong Vo
(74) *Attorney, Agent, or Firm* — Schultz & Associates, P.C.

(57) ABSTRACT

A system and method for analyzing and validating oil and gas well production data is disclosed. The system includes a network, a server connected to the network, and a set of wells connected to the network. In a preferred embodiment, the server is programmed to store and execute the method. The method includes the steps of collecting a set of data from the set of wells, performing an first RPI® evaluation on the set of data, creating a matched data set from the set of data, segregating the matched data set into a set of comparison groups, normalizing each comparison group of the set of comparison groups, calculating a set of performance metrics between a subset of the set of comparison groups, and calculating a probability for each performance metric of the set of performance metrics.

17 Claims, 8 Drawing Sheets

(56) References Cited

U.S. PATENT DOCUMENTS

| | | | |
|---|---|---|---|
| 7,225,078 | B2 | 5/2007 | Shelley et al. |
| 7,369,979 | B1 | 5/2008 | Spivey |
| 7,584,165 | B2 | 9/2009 | Buchan |
| 8,131,470 | B2 | 3/2012 | Yusti et al. |
| 8,214,243 | B2 | 7/2012 | Graham et al. |
| 8,244,509 | B2 | 8/2012 | Banerjee et al. |
| 8,396,826 | B2 | 3/2013 | Mijares et al. |
| 8,504,341 | B2 | 8/2013 | Cullick et al. |
| 8,524,643 | B2 | 9/2013 | Huff et al. |
| 8,573,299 | B2 | 11/2013 | Dwarakanath et al. |
| 2002/0122392 | A1* | 9/2002 | Elezabi .............. H04B 1/7107 370/320 |
| 2009/0065198 | A1 | 3/2009 | Suarez-Rivera et al. |
| 2009/0254325 | A1 | 10/2009 | Gokdemir et al. |
| 2011/0040536 | A1 | 2/2011 | Levitan |
| 2011/0098931 | A1 | 4/2011 | Kosmala et al. |
| 2013/0132289 | A1* | 5/2013 | Agnew ................. G06Q 50/16 705/313 |

OTHER PUBLICATIONS

R. Gaskari, et al., "An Integrated Technique for Production Data Analysis (PDA) with Application to Mature Fields," SPE Production & Operations, Nov. 2007, pp. 403-416, Society of Petroleum Engineers.

Celso K. Morooka, et al., "Development of Intelligent Systems for Well Drilling and Petroleum Production," Journal of Petroleum Science & Engineering, 2001, pp. 191-199, vol. 32, Elsevier Science B.V.

Shunsuke Managi, et al., "Stochastic Frontier Analysis of Total Factor Productivity in the Offshore Oil and Gas Industry," Nov. 2005, https://darchive.mblwhoilibrary.org/bitstream/handle/1912/1368/SFA%20final%20%28Managi%29.pdf.txt?sequence=3.

* cited by examiner

SYSTEM AND METHOD FOR ANALYZING AND VALIDATING OIL AND GAS WELL PRODUCTION DATA

CROSS-REFERENCE TO RELATED APPLICATION

This application is a Continuation of application Ser. No. 14/257,621, filed Apr. 21, 2014, which claims priority to U.S. Provisional Application No. 61/901,948, filed Nov. 8, 2013. Each patent application identified above is incorporated here by reference in its entirety to provide continuity of disclosure.

FIELD OF THE INVENTION

The field of this application is oil and gas well management, namely, providing a system and method for evaluating the production, characteristics and economic value of oil and gas wells.

BACKGROUND OF THE INVENTION

Oil and gas reservoirs are underground formations of rock containing oil and/or gas. The type and properties of the rock vary by reservoir and within reservoirs. For example, a porosity and a permeability of reservoir rock may vary from well to well within a reservoir. The porosity is the percentage of pore volume, or void space, within the reservoir rock that can contain fluids. The permeability is an estimate of the ability of reservoir rock to permit the flow of fluids.

Many oil and gas wells in the United States produce from low-permeability, shale, or "tight" reservoirs. These reservoirs present many challenges in drilling, completions, and reservoir evaluation. In order to produce at economic rates, low-permeability wells must be completed by a stimulation treatment, such as hydraulic fracturing. A typical fracture treatment represents a significant fraction of the total cost of drilling and completing the well. Hence, whether or not a fracture treatment will be economically productive is a question of great interest to the operator.

In conventional reservoirs, determining the success of a stimulation treatment is performed by conducting and analyzing a buildup test or other type of pressure transient test after the treatment is applied to the reservoir. The rate at which a pressure transient moves through a reservoir is a function of the permeability. As a result, low-permeability reservoirs require long test times to sample a significant portion of the reservoir. Further, it is now known that the shut-in associated with the build-up test can significantly harm a well's productivity. Therefore, pressure transient tests are of limited application for hydraulically fractured wells in low-permeability reservoirs, where weeks or years are required to obtain usable pressure data and thereby increasing operation costs.

In an attempt to reduce costs, production of a well in the reservoir may be estimated prior to the proposed stimulation treatment or in order to select the best possible new well locations to maximize profitability. Production of oil, gas, and/or byproducts thereof from a well is usually estimated by analyzing production data. Because direct measurement of future production data is not possible in forecasting overall production, the production estimations are frequently unreliable.

The prior art has attempted to solve the problem of unreliable estimates with limited success. For example, U.S. Pat. No. 7,225,078 to Shelley et al. discloses a system and method for predicting production of a well. The system collects and processes data from a set of wells of a reservoir to generate a production prediction model for the set of wells. The data collected are logs from the set of wells, including MRI logs. The system clusters the log data from various wells based on similar predetermined characteristics, preferably by the MRI log, to generate a set of log profiles. The set of log profiles are correlated with validation indicators. The system optimizes the log profiles by reducing or adding the number of clusters in a log profile to obtain or approach a linear alignment of the log profile with the validation indicators. A set of production indicators is associated with each log profile. The set of production indicators may be based on average swab test results or a subset of the validation indicators. The optimized set of log profiles and associated production indicators is stored as a production prediction model. However, the system and method in Shelley cannot evaluate the reliability of the prediction model.

U.S. Pat. No. 7,369,979 to Spivey discloses a method for forecasting performance of wells in multilayer reservoirs having commingled production. A multi-layer predictive model is first calculated including a fluid property model, a tubing pressure gradient model, and a single layer predictive model. A non-linear regression module is used to generate synthetic models to compare to observed data. The method begins by collecting data a well in a reservoir. The fluid property model is calculated from the data over a predetermined time. The tubing pressure gradient model is calculated from the fluid property model. A single layer prediction model is calculated for each layer in the reservoir, thereby generating the multi-layer predictive model. A synthetic production history and a set of synthetic production log data are generated using the multi-layer prediction model and the non-linear regression module to compare with an observed production history and an observed production log data, respectively. However, like Shelley, the prediction model in Spivey does not include any means for calculating the accuracy of the prediction model.

The prior art does not disclose or suggest a system and method for analyzing and validating oil and gas well production data. Therefore, there is a need in the art for a system and method for predicting the production of oil and gas wells and verifying the accuracy of the prediction. Especially for shale wells, there is a need for the interpretability of water data.

SUMMARY

A system and method for analyzing and validating oil and gas well production data is disclosed. The system includes a network, a server connected to the network, and a set of wells connected to the network. In a preferred embodiment, the server is programmed to store and execute the method. The method includes the steps of collecting a set of data from the set of wells, performing an RPI® evaluation on the set of data, creating a matched data set from the set of data, segregating the matched data set into a set of comparison groups, normalizing each comparison group of the set of comparison groups, calculating a set of performance metrics between a subset of the set of comparison groups, and calculating a probability for each performance metric of the set of performance metrics.

BRIEF DESCRIPTION OF THE DRAWINGS

The disclosed embodiments will be described with reference to the accompanying drawings.

DETAILED DESCRIPTION

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, C++, C#, .NET, Objective C, Ruby, Python SQL, Visual Basic, or other modern and commercially available programming languages.

Figure 1:
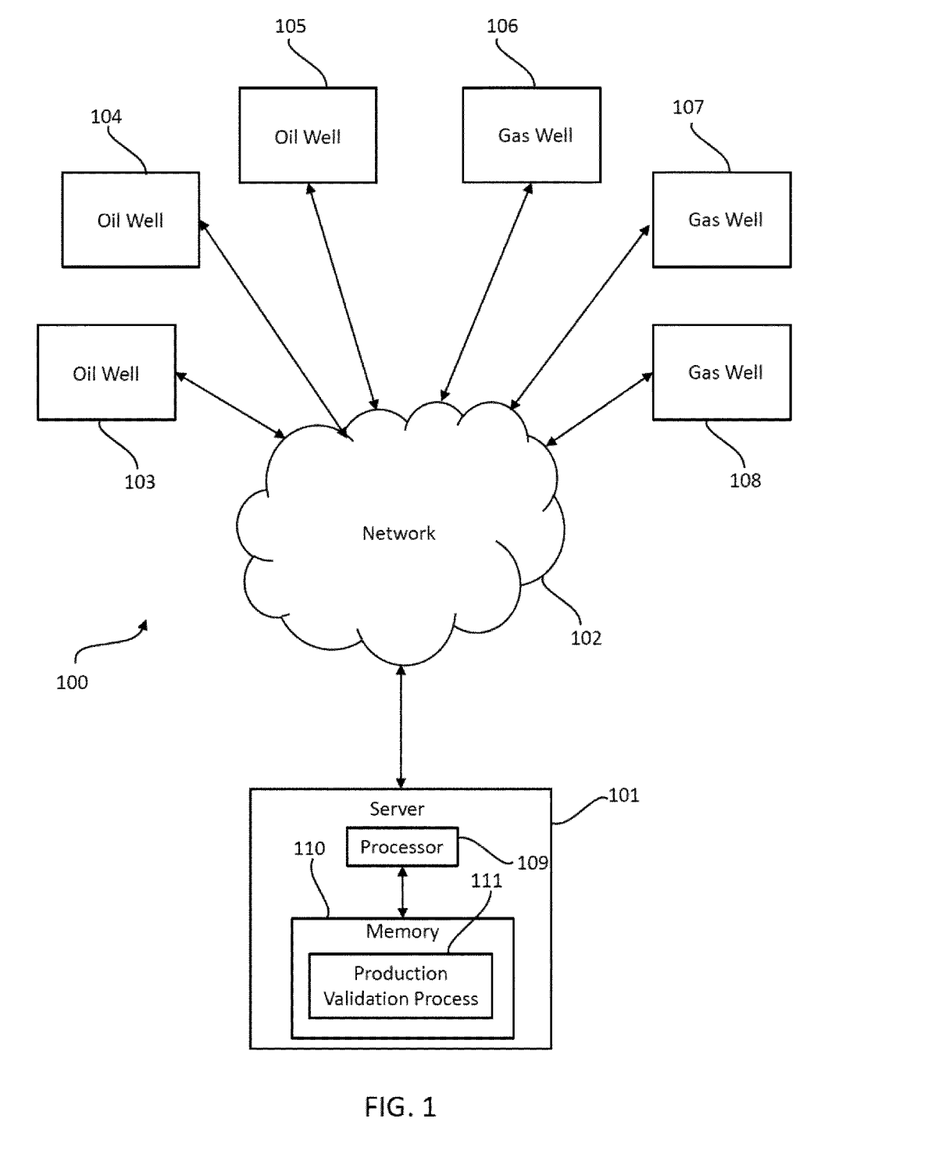
FIG. 1 is a schematic for a system for analyzing oil and gas well production data of a preferred embodiment.

Referring to FIG. 1, system 100 includes server 101 connected to network 102, oil wells 103, 104, and 105, each of which is connected to network 102, and gas wells 106, 107, and 108, each of which is connected to network 102.

Server 101 includes processor 109 and memory 110 connected to processor 109. Production validation process 111 is stored in memory 110 and is executed by processor 109. Production validation process 111 collects and processes data from each of oil wells 103, 104, and 105 and gas wells 106, 107, and 108, as will be further described below.

In a preferred embodiment, each of oil wells 103, 104, and 105 and gas wells 106, 107, and 108 includes a set of sensors that receive and transmit data to server 101 through network 102. Any sensor known in the art may be employed.

In another embodiment, data from each of oil wells 103, 104, and 105 and gas wells 106, 107, and 108 is manually entered into memory 110 of server 101.

Figure 2:
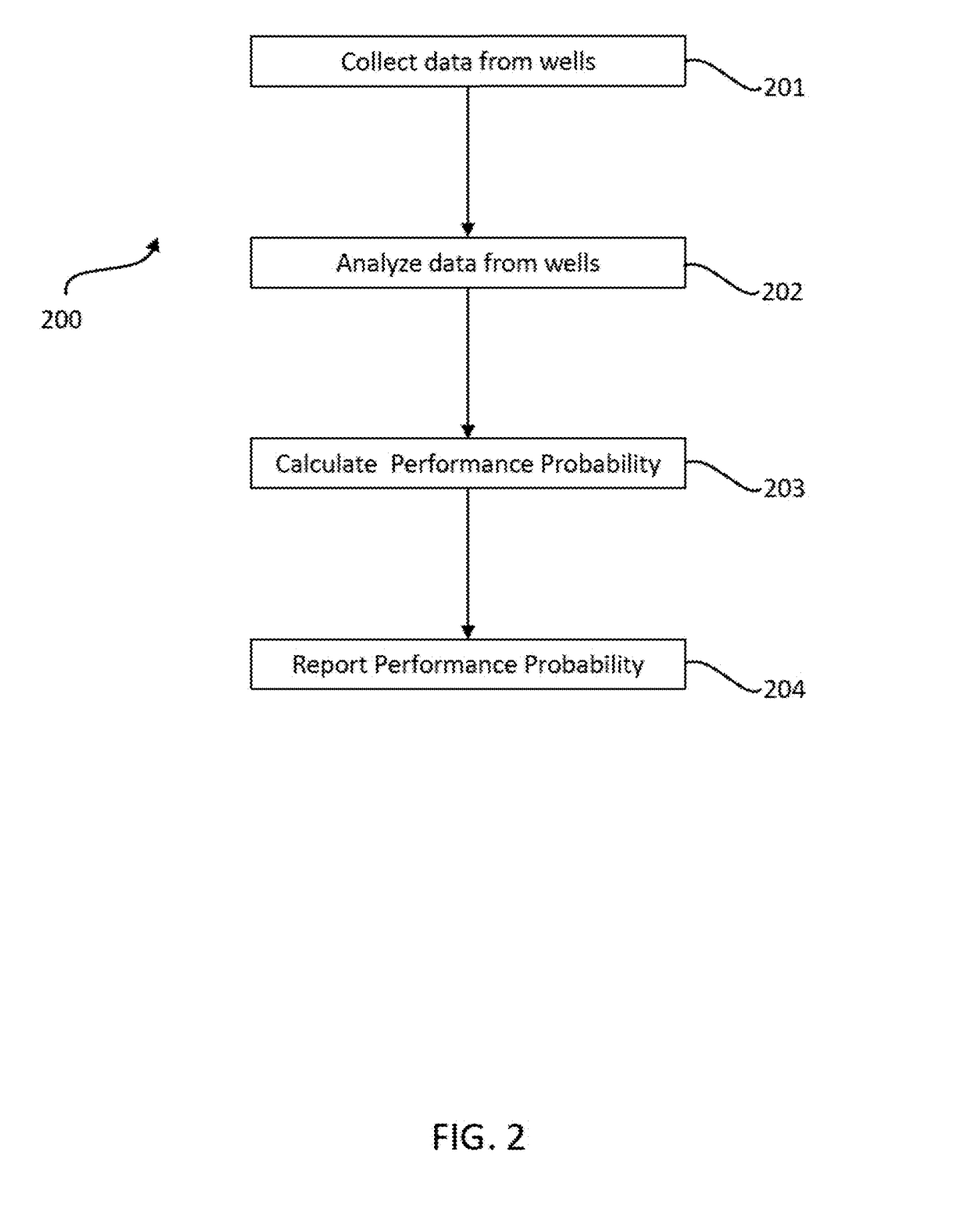
FIG. 2 is a flowchart of a production validation process of a preferred embodiment.

Referring to FIG. 2, production validation process 200 will be further described. In step 201, a data set from each of a set of oil wells and gas wells are collected. In a preferred embodiment, the set of oil and gas wells includes a baseline well group and a validation well group, from which a baseline well group set of data and a validation well group set of data is respectively collected. In this embodiment, the baseline well group is a group of wells to which no operating or completion practice will be applied, i.e., a control group of wells. In this embodiment, the validation group is a group of wells that an operating or completion practice will be applied. Any operating or completion practice known in the art may be employed. In this embodiment, each of the baseline well group and the validation well group data sets includes a completion and workover history data set and a production history data set as shown in Table 1 below.

TABLE 1

| Data Sets for Baseline Well Group and Validation Well Group | |
| --- | --- |
| Completion and Workover History | Production History |
| Wellbore diagram | Initial flowback report |
| Initial stimulations | Daily production history |
| Workover | Any pumper's notes |

In this embodiment, the completion and workover history data set includes a wellbore diagram, an initial stimulations data set, and a workover data set. The wellbore diagram includes a set of stage locations, a set of measured depths, an average true vertical depth ("TVD"), and an initial tubulars description and length. The initial stimulations data set is by stage as pumped, not as designed or as proposed stimulations. The initial stimulations data set includes: a working fluid volume that is used to place packer/ball, fire guns, clean out, and any working fluid for any other purpose; a pad fluid volume; a treating fluid volume, a type of treating fluid, and compositions; a proppant type and placement schedule; a flush volume; and a treating pressure history. The workover data set includes data from any artificial lift installation, or operation, and any other in-well operations, including hot oiling, and paraffin scraping. The workover data set includes a kill fluid type and volume, and any workover report.

In this embodiment, the production history data set includes an initial flowback report, a daily production history, and any pumper's notes. The initial flowback report is preferably measured at least hourly. Other measuring frequencies may be employed.

In a preferred embodiment, the initial flowback report includes the measured rates of produced phases of each well, the surface wellhead flowing pressure, the surface wellhead flowing temperature, any working fluid volumes for a gas lift, jet pump, or any other means, and any working fluid injection pressures.

In step 202, the data from the wells is analyzed, as will be further described below. Other data known in the art may be employed.

In step 203, a performance probability for each metric of the analyzed data is calculated. In a preferred embodiment, the analysis of variance ("ANOVA") is used to calculate the performance probability for each metric. Other methods of calculating probability known in the art may be employed.

In step 204, the performance probability is reported. In one embodiment, a report document is created. In this embodiment, the report document includes a set of histograms, a set of comparative performance graphs, and a set of difference values, as will be further described below. In another embodiment, a visual presentation of the performance probability is created. Any reporting means and mediums known in the art may be employed.

In one embodiment, each metric and performance probability is reported in a table, such as shown in Table 2 below. In this example below, a group of wells using an organic nano-fluid interfacial tension modifier ("OnF"), i.e., the validation group, is compared to a group of wells not using the "OnF", i.e., the baseline group.

TABLE 2

| Performance Metric | "OnF" Wells Averages | Non-"OnF" Wells Averages | Probability that "OnF" Wells are different from Non-"OnF" Wells |
|---|---|---|---|
| Well count | 10 | 6 | |
| Total Proppant Pumped (K lbs) | 908 | 940 | 26.1 |
| Reservoir Conductivity (mDs * ft) | 1.72 | 1.40 | 89.8 |
| Initial Effective Fracture Length (ft) | 177 | 112 | 97.4 |
| Effective Fracture Length Change due to Damage (ft) | 13.9 | 41.4 | 94.6 |
| Estimated Gas Recovery (20 yrs @200 psig) (MMCF) | 9787 | 7300 | 99.3 |
| "Net Present Volume" (20 yr estimated gas recovery @ 20% discount) (MMCF) | 3187 | 2319 | 99.5 |

Figure 3A:
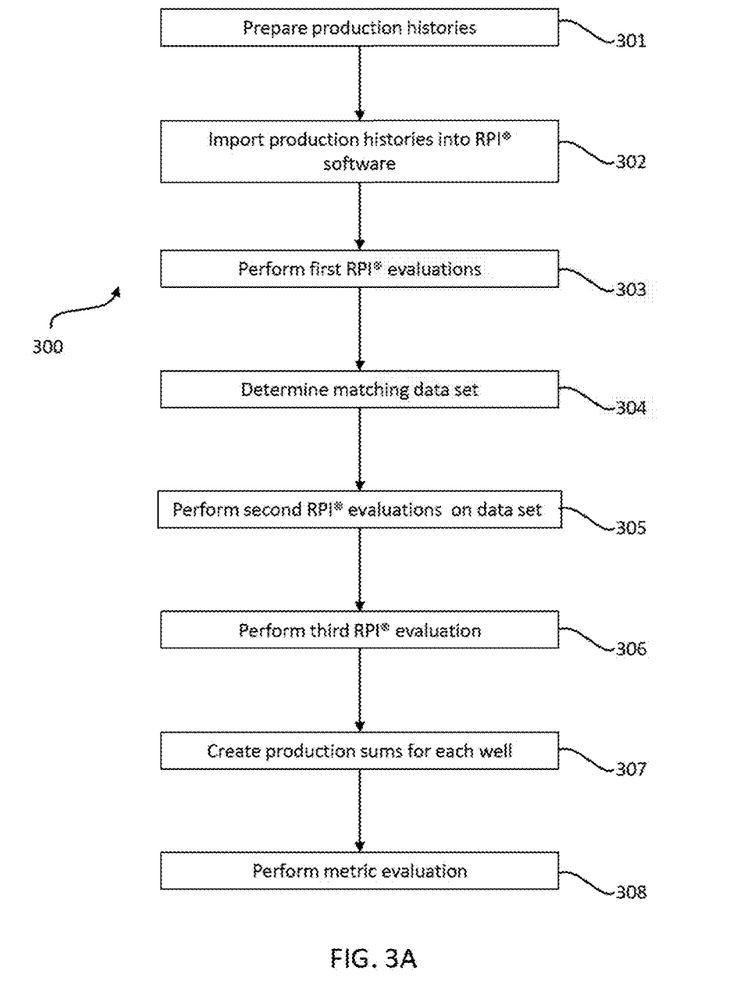
FIG. 3A is a flowchart of an analysis process of a preferred embodiment.

Referring to FIG. 3A, step 202 will be further described as analysis process 300. In step 301, the production history data set of each well is prepared. In this step, the individual well production history data sets are merged into a Microsoft Excel spreadsheet with an Excel page for each well data set.

In step 302, the spreadsheet pages are imported into RPI® Production Analysis software available from Performance Sciences, Inc. ("RPI®"). In this step, a TVD, an estimated initial pressure, a reservoir temperature, an estimated porosity, an estimated contributing thickness, a set of tubulars descriptions, and workover events including refracs and artificial lift installation are imported into RPI®.

In step 303, a first RPI® evaluation is performed using RPI®. In this step, whether the individual well data sets contain usable production signatures is verified. As used in this application, a production signature is a qualitative graphically shaped pattern exhibited by the production data when plotted which is diagnostic of the reservoir system condition. For example, a transient inducing event is a production signature.

Figure 3B:
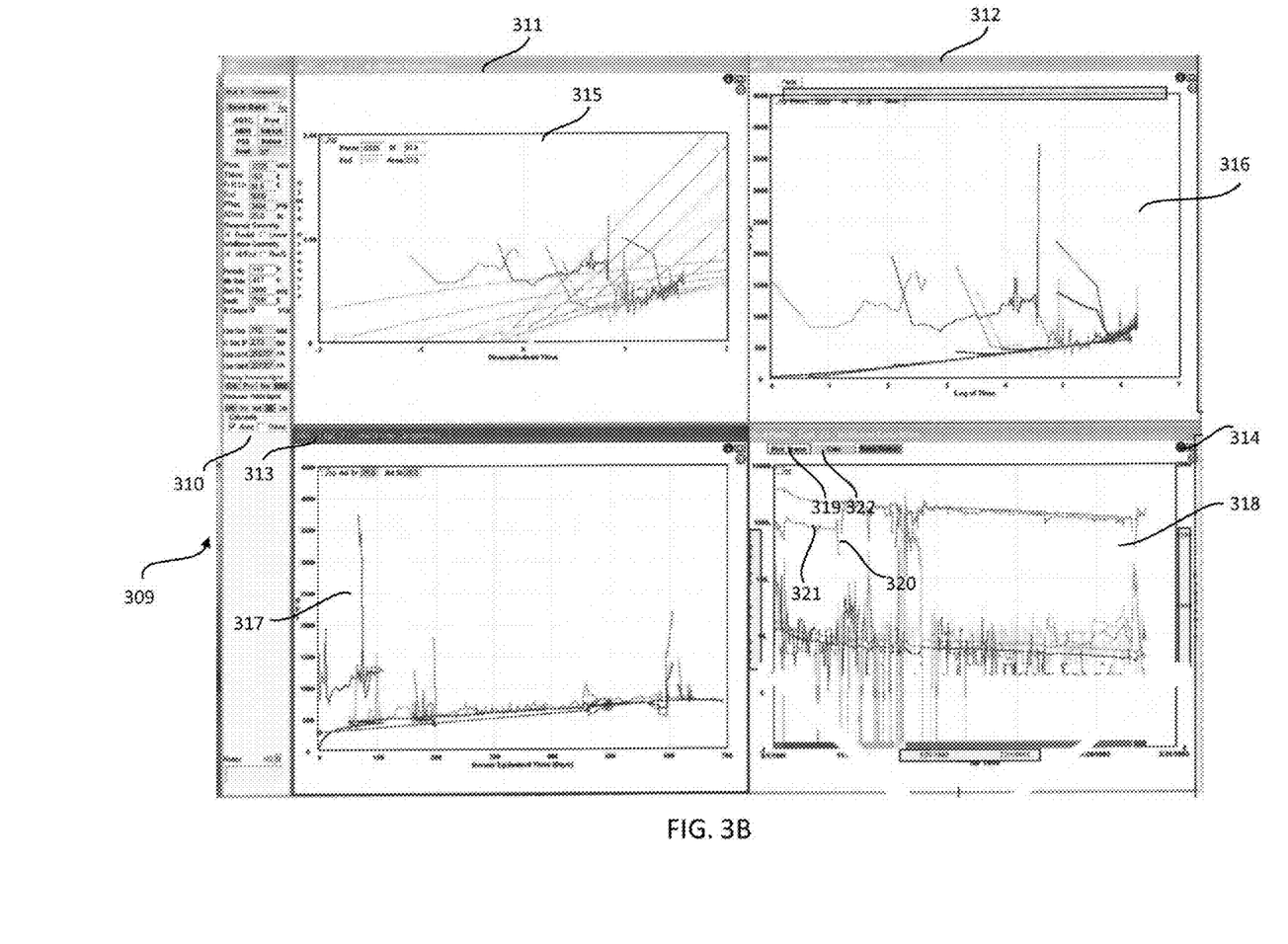
FIG. 3B is a set of graphs of a production signature verification process of a preferred embodiment.

In this step, transient inducing events are identified. Referring to FIG. 3B, screen 309 includes menu 310 and windows 311, 312, 313, and 314 that include graphs 315, 316, 317, and 318, respectively. Transient inducing events are identified in graph 318 using transient tool 319 and inserted into the data set for each well by selecting "calc" tool 322. For example, portion 320 of curve 321 indicates a transient inducing event has occurred. Transient tool 319 is selected and portion 320 is highlighted by "clicking" and "dragging" the cursor over portion 320. Once portion 320 is highlighted, portion 320 is inserted into the data set by selecting "calc" tool 322. The resulting signatures are examined for evidence of depletion or interference from offset wells, frac-through, and natural fracture overprint.

In a preferred embodiment, graph 315 is an Agarwal-Gringarten Log-Log Type Curve ("AGTC") graph. In this embodiment, graph 316 is a Miller-Dyes-Hutchinson ("MDH") semi-log graph. In this embodiment, graph 317 is a Pseudo-Steady State ("PSS") graph. In this embodiment, graph 318 is an Arps production decline graph.

Returning to FIG. 3A in step 304, the data set used for performance matching is determined. In this step, whether a full data set or a limited or partial data set for a predetermined timeframe is determined as the performance matching data set. In this step, incomplete well data sets may be excluded.

In step 305, a second RPI® evaluation using RPI® is performed on the matching data set determined in step 304. In this step, the matching data set of each well is matched using the history-matching function in RPI® based on its production history for each of a reservoir quality or conductivity, an effective reservoir/wellbore connectivity, a pressure-contacted volume, and an initial reservoir average pressure to a predicted production data set. The predicted production data set and a corresponding predicted production curve are generated by RPI®, as will be further described below. The reservoir quality is described by a reservoir conductivity measured in terms of the product of the permeability times thickness measured from the matching process, as will be further described below. The effective reservoir/wellbore connectivity can be described by an apparent fracture half-length or enhanced conductivity reservoir volume. The pressure contacted volume is the volume providing pressure support for the well's production.

By history-matching the data curves for each well, the predicted production data curve will be aligned with production history data curve for each well, thereby producing predicted production data that follows a pattern produced by the production history data. Once the data curves are aligned, the RPI® software recalculates each predicted production data metric to closer create a matched data set. Each metric of the matched data set follows each historical production data metric, as will be further described below.

Figure 3C:
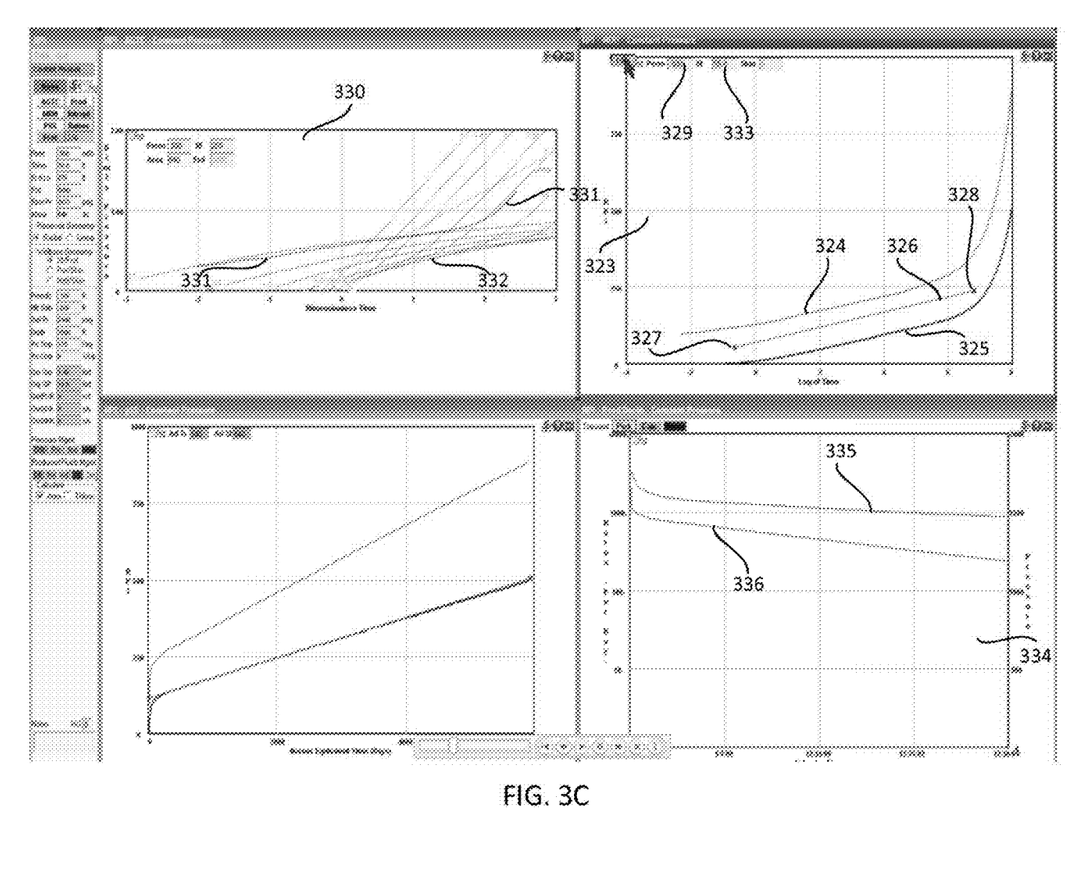
FIG. 3C is a set of graphs of a Miller-Dyes-Hutchinson ("MDH") semi-log type curve history matching process of a preferred embodiment.

Referring to FIG. 3C, AGTC graph 330 includes curve 331 and infinite-acting curve 332. Production decline graph 334 has predicted production curve 335 and historical data curve 336. MDH graph 323 includes historical data curve 324 and predicted curve 325. Match bar 326 of MDH graph 323 is selected and moved to align with historical data curve 324. Handles 327 and 328 may be selected and dragged to adjust the slope of match bar 326 to further align match bar 326 with historical data curve 324. Adjusting the slope of match bar 326 will change the value of predicted permeability 329 and apparent fracture half-length 333. Aligning match bar 326 with historical data curve 324 will align predicted curve 325 with historical data curve 324. When predicted curve 325 is aligned with historical data curve 324, predicted permeability 329 and apparent fracture half-length 333 is recalculated for the data set.

Figure 3D:
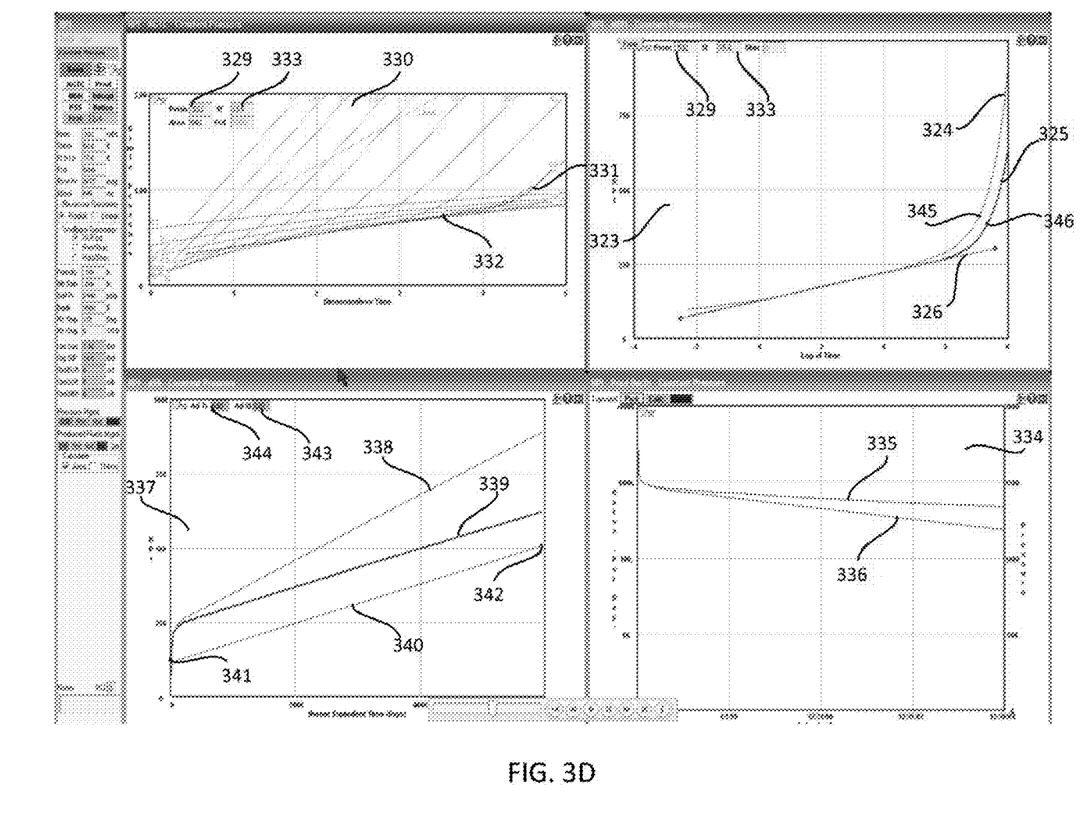
FIG. 3D is a set of graphs of a Pseudo-Steady State ("PSS") type curve history matching process of a preferred embodiment.

Referring to FIG. 3D, predicted permeability 329 and apparent fracture half-length 333 have been recalculated. Curve 331 is aligned with infinite-acting curve 332 and predicted production curve 335 is closer in alignment to historical data curve 336 than that shown in FIG. 3C.

PSS graph 337 has historical data curve 338 and predicted curve 339. Historical data curve 338 is the square root of curved portion 345 of historical data curve 324 of MDH graph 323. Predicted curve 339 is the square root of curved portion 346 of predicted curve 325 of MDH graph 323. Predicted curve 339 will be aligned with historical data curve 338 using match bar 340 as previously described. Match bar 340 has handles 341 and 342. Changing the slope of match bar 340 recalculates the values of drained area acres 343 and drained area transient time 344.

Figure 3E:
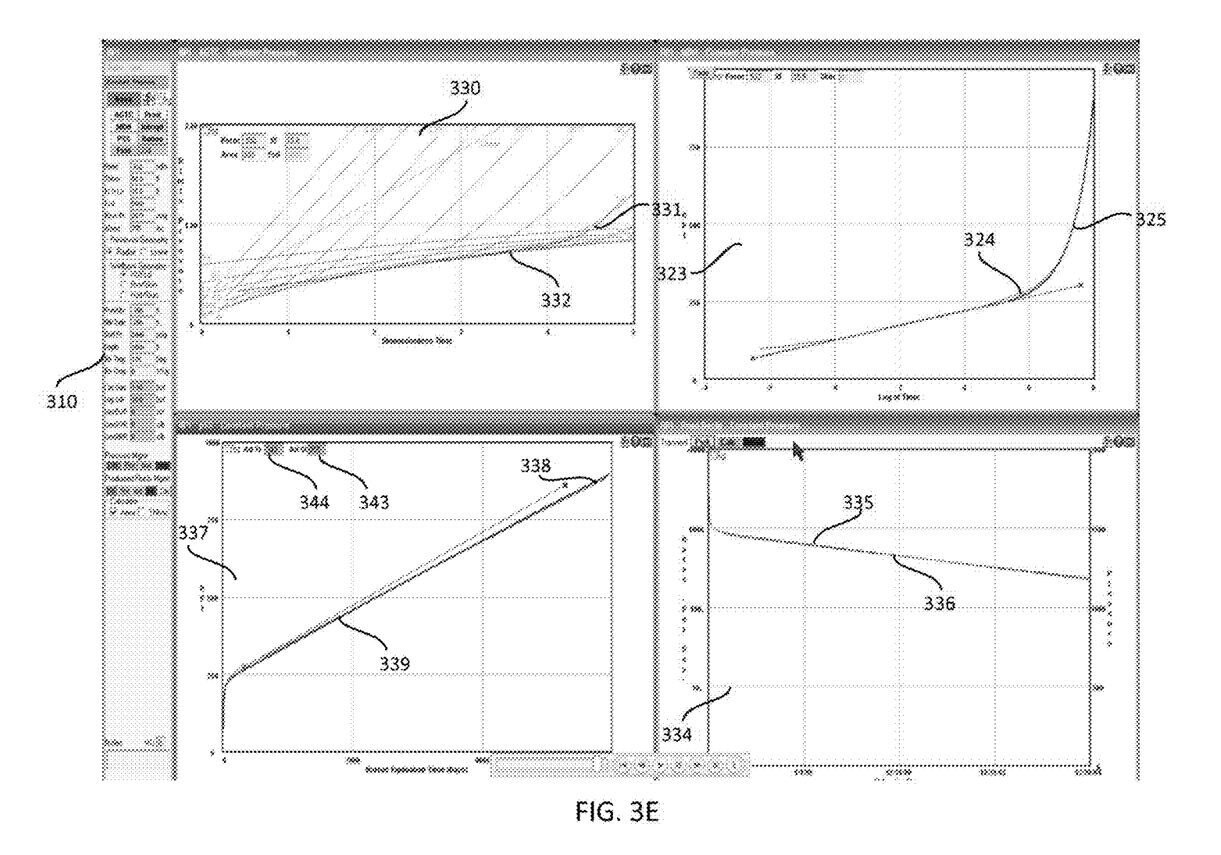
FIG. 3E is a set of graphs depicting a set of history matched curves.

Referring to FIG. 3E, drained area acres 343 and drained area transient time 344 have been recalculated. Historical data curve 338 is aligned with predicted curve 339 of PSS graph 337 and historical data curve 324 of MDH graph 323 is further aligned with predicted curve 325 of MDH graph 323. Predicted production curve 335 is now aligned with historical data curve 336. The predicted production data set is recalculated to created a matched data set. The matched data set follows the curved pattern produced by the historical production data set and is displayed in menu 310.

In this step, a set of log cumulative frequency histograms of the matched data set is created and examined for any data outliers. In a preferred embodiment, a data outlier is defined as data beyond at least one logarithmic standard deviation. Other definitions for a data outlier may be used.

In this step, the matched data set is reviewed for any data outliers. The matched data can be modified as needed, recognizing that alteration of the observed hydrocarbon production data implies a fiduciary obligation, since it is the basis for financial transactions.

In this step, any impact of shut-in events, changes in reservoir/wellbore connectivity, or reservoir conductivity are evaluated.

Returning to FIG. 3A in step 306, a third RPI® evaluation is performed to ensure consistency of the results of steps 303 and 305 by repeating steps 303 and 305.

In step 307, a set of production sums for each well is created from the matched data set based on the shortest reported production history of the set of wells. The set of production sums include an average pressure drawdown history for each sum. In this step, any working fluid volumes may be used to correct the reported volumes of that working fluid phase. In this step, each production sum is converted to a cumulative oil or gas equivalent as needed, for example, a BTU based equivalent or a value-based equivalent.

In step 308, a set of performance metrics is evaluated for the matched data set, as will be further described below.

Figure 4:
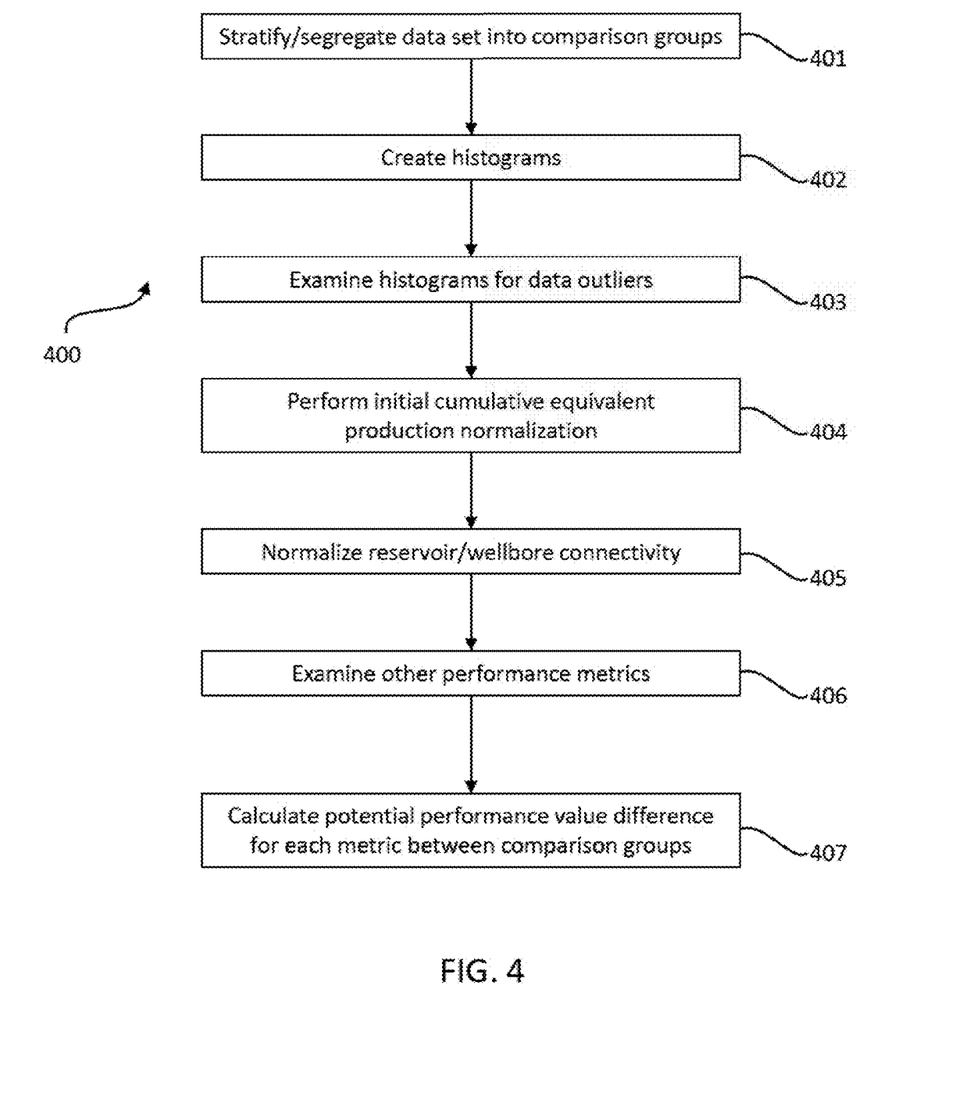
FIG. 4 is a flowchart of a performance metric evaluation process of a preferred embodiment.

Referring to FIG. 4, step 308 will be further described as process 400. In step 401, the matched data set is stratified or segregated into comparison groups. For example, the matched data set may be segregated into a first group that employs an organic nano-fluid interfacial tension modifier ("OnF"), i.e., the validation group, and a second group that does not employ the OnF, i.e., the baseline group. Other comparison groups in any number may be employed.

In step 402, a set of histograms is created for each comparison group. In a preferred embodiment, each set of histograms is a set of raw, un-normalized log cumulative frequency histograms. In this embodiment, each histogram includes a reservoir quality, a reservoir/wellbore connectivity, a treatment size, and a set of un-normed production sums for each well.

In step 403, each histogram is examined for any data outliers. In this step, a potential cause for any data outlier is assessed and a response action is determined that includes whether to include the data outlier, weight the data outlier, or exclude the data outlier.

In a preferred embodiment, a data outlier is defined as data beyond at least one logarithmic standard deviation. Other definitions for a data outlier may be used.

Any method of weighing a data outlier known in the art may be employed.

In step 404, an initial cumulative equivalent production normalization is performed for each comparison group for the reservoir quality, the pressure drawdown, the treatment size, a delay from end of stimulation to first production, a shut-in impact, and an effect of any artificial lift. In this step, the normalization process, based on the physical principles of the flow of fluids in a porous media, "ratios" the metric being normalized according to whether the normalizing parameter, such as reservoir quality, is larger or smaller than the population log-normal mean or other proper statistical moment.

In step 405, the reservoir/wellbore connectivity is normalized for a treatment size, a proppant type, and a proppant conductivity for each comparison group. In a preferred embodiment, the treatment size is the amount of placed proppant in pounds. As needed, the treatment size may require further normalization for proppant conductivity adjusted according to published tables, as updated from time to time, for the ambient stress, temperature and age of the proppant.

In step 406, any remaining performance metrics may be examined and identified for calculation as described below, as needed. For example, any treating pressures, long-term performance behavior, response to artificial lift, and resistance to damage mechanisms, including subsequent workovers, shut-ins, and frac-throughs, may be examined.

In step 407, a potential performance value difference between comparison groups is calculated for each metric, including the set of production sums. In this step, a forecast value difference for different events is calculated as needed. For example, a forecast value difference may be calculated for any stimulation, delay to first production, shut-ins, artificial lift installation, and re-stimulation.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. In a system comprising a network, a server connected to the network, a set of wells connected to the network, the server programmed to store and execute instructions that cause the system to perform a method comprising the steps of:

collecting a set of data from the set of wells;
creating a matched data set from the set of data;
generating a set of performance metrics from the matched data set;
calculating a probability for each performance metric of the set of performance metrics;
providing a first probability of a first performance metric that indicates whether the first performance metric for a first comparison group is different from the first performance metric for a second comparison group;
wherein the data includes hourly data of measured rates of produced phases of each well and further includes:
a surface wellhead flowing pressure,
a surface wellhead flowing temperature,
a working fluid volume for one of a gas lift and a jet pump, and
a working fluid injection pressure.

2. In a system comprising a network, a server connected to the network, a set of wells connected to the network, the server programmed to store and execute instructions that cause the system to perform a method comprising the steps of:
collecting a set of data from the set of wells;
creating a matched data set from the set of data;
generating a set of performance metrics from the matched data set;
calculating a probability for each performance metric of the set of performance metrics;
providing a first probability of a first performance metric that indicates whether the first performance metric for a first comparison group is different from the first performance metric for a second comparison group;
providing the performance metrics that comprise:
a total proppant pumped,
a reservoir conductivity,
an initial effective fracture length,
an effective fracture length change,
an estimated gas recovery, and
a net present volume.

3. In a system comprising a network, a server connected to the network, a set of wells connected to the network, the server programmed to store and execute instructions that cause the system to perform a method comprising the steps of:
collecting a set of data from the set of wells;
creating a matched data set from the set of data;
generating a set of performance metrics from the matched data set;
calculating a probability for each performance metric of the set of performance metrics;
providing a first probability of a first performance metric that indicates whether the first performance metric for a first comparison group is different from the first performance metric for a second comparison group; and,
providing the first comparison group as a validation group from a first set of wells that use an organic nano-fluid interfacial tension modifier.

4. In a system comprising a network, a server connected to the network, a set of wells connected to the network, the server programmed to store and execute instructions that cause the system to perform a method comprising the steps of:
collecting a set of data from the set of wells;
creating a matched data set from the set of data;
generating a set of performance metrics from the matched data set;
calculating a probability for each performance metric of the set of performance metrics;
providing a first probability of a first performance metric that indicates whether the first performance metric for a first comparison group is different from the first performance metric for a second comparison group; and,
providing the second comparison group as a baseline group from a second set of wells that do not use the organic nano-fluid interfacial tension modifier.

5. In a system comprising a network, a server connected to the network, a set of wells connected to the network, the server programmed to store and execute instructions that cause the system to perform a method comprising the steps of:
collecting a set of data from the set of wells;
creating a matched data set from the set of data;
generating a set of performance metrics from the matched data set;
calculating a probability for each performance metric of the set of performance metrics;
providing a first probability of a first performance metric that indicates whether the first performance metric for a first comparison group is different from the first performance metric for a second comparison group;
wherein the set of data further comprises a set of historical production data for each well of the set of wells, and wherein the step of creating a matched data set further comprises the steps of:
generating a historical production curve from the set of historical production data for each well of the set of wells;
generating a set of predicted production data from the historical production data for each well of the set of wells;
generating a predicted production curve from the set of predicted production data for each well of the set of wells;
matching the predicted production curve with the historical production curve for each well of the set of wells; and,
recalculating the set of predicted production data.

6. The method of claim 5, further comprising the step of calculating a set of production sums from the matched data set for each well of the set of wells.

7. In a system comprising a network, a server connected to the network, a set of wells connected to the network, the server programmed to store and execute instructions that cause the system to perform a method comprising the steps of:
collecting a set of data from the set of wells;
creating a matched data set from the set of data;
segregating the matched data set into a set of comparison groups;
normalizing each comparison group of the set of comparison groups;
calculating a set of performance metrics between a subset of the set of comparison groups;
calculating a probability for each performance metric of the set of performance metrics;
providing a first probability of a first performance metric that indicates whether the first performance metric for a first comparison group is different from the first performance metric for a second comparison group;
wherein the data includes hourly data of measured rates of produced phases of each well and further includes:

a surface wellhead flowing pressure,
a surface wellhead flowing temperature,
a working fluid volume for one of a gas lift and a jet pump, and
a working fluid injection pressure.

8. In a system comprising a network, a server connected to the network, a set of wells connected to the network, the server programmed to store and execute instructions that cause the system to perform a method comprising the steps of:
collecting a set of data from the set of wells;
creating a matched data set from the set of data;
segregating the matched data set into a set of comparison groups;
normalizing each comparison group of the set of comparison groups;
calculating a set of performance metrics between a subset of the set of comparison groups;
calculating a probability for each performance metric of the set of performance metrics;
providing a first probability of a first performance metric that indicates whether the first performance metric for a first comparison group is different from the first performance metric for a second comparison group;
providing the performance metrics that comprise:
a total proppant pumped,
a reservoir conductivity,
an initial effective fracture length,
an effective fracture length change,
an estimated gas recovery, and
a net present volume.

9. In a system comprising a network, a server connected to the network, a set of wells connected to the network, the server programmed to store and execute instructions that cause the system to perform a method comprising the steps of:
collecting a set of data from the set of wells;
creating a matched data set from the set of data;
segregating the matched data set into a set of comparison groups;
normalizing each comparison group of the set of comparison groups;
calculating a set of performance metrics between a subset of the set of comparison groups;
calculating a probability for each performance metric of the set of performance metrics;
providing a first probability of a first performance metric that indicates whether the first performance metric for a first comparison group is different from the first performance metric for a second comparison group; and,
providing the first comparison group as a validation group from a first set of wells that use an organic nano-fluid interfacial tension modifier.

10. The method of claim 9, further comprising the step of providing the second comparison group as a baseline group from a second set of wells that do not use the organic nano-fluid interfacial tension modifier.

11. In a system comprising a network, a server connected to the network, a set of wells connected to the network, the server programmed to store and execute instructions that cause the system to perform a method comprising the steps of:
collecting a set of data from the set of wells;
creating a matched data set from the set of data;
segregating the matched data set into a set of comparison groups;
normalizing each comparison group of the set of comparison groups;
calculating a set of performance metrics between a subset of the set of comparison groups;
calculating a probability for each performance metric of the set of performance metrics;
providing a first probability of a first performance metric that indicates whether the first performance metric for a first comparison group is different from the first performance metric for a second comparison group;
wherein the set of data further comprises a set of historical production data for each well of the set of wells, and wherein the step of creating a matched data set further comprises the steps of:
generating a historical production curve from the set of historical production data for each well of the set of wells;
generating a set of predicted production data from the historical production data for each well of the set of wells;
generating a predicted production curve from the set of predicted production data for each well of the set of wells;
matching the predicted production curve with the historical production curve for each well of the set of wells; and,
recalculating the set of predicted production data.

12. The method of claim 11, further comprising the step of calculating a set of production sums from the matched data set for each well of the set of wells.

13. A system for verifying oil and gas production, comprising:
a network;
a server, connected to the network;
a set of wells connected to the network;
the server programmed to carry out the steps of:
receiving a set of data from the set of wells;
creating a matched data set from the set of data;
generating a set of performance metrics from the matched data set
calculating a probability for each performance metric of the set of performance metrics;
providing a first probability of a first performance metric that indicates whether the first performance metric for a first comparison group is different from the first performance metric for a second comparison group;
wherein the data includes hourly data of measured rates of produced phases of each well and further includes:
a surface wellhead flowing pressure,
a surface wellhead flowing temperature,
a working fluid volume for one of a gas lift and a jet pump, and
a working fluid injection pressure.

14. A system for verifying oil and gas production, comprising:
a network;
a server, connected to the network;
a set of wells connected to the network;
the server programmed to carry out the steps of:
receiving a set of data from the set of wells;
creating a matched data set from the set of data;
generating a set of performance metrics from the matched data set
calculating a probability for each performance metric of the set of performance metrics;

providing a first probability of a first performance metric that indicates whether the first performance metric for a first comparison group is different from the first performance metric for a second comparison group;
providing the performance metrics that comprise:
a total proppant pumped,
a reservoir conductivity,
an initial effective fracture length,
an effective fracture length change,
an estimated gas recovery, and
a net present volume.

15. A system for verifying oil and gas production, comprising:
a network;
a server, connected to the network;
a set of wells connected to the network;
the server programmed to carry out the steps of:
receiving a set of data from the set of wells;
creating a matched data set from the set of data;
generating a set of performance metrics from the matched data set
calculating a probability for each performance metric of the set of performance metrics;
providing a first probability of a first performance metric that indicates whether the first performance metric for a first comparison group is different from the first performance metric for a second comparison group;
providing the first comparison group as a validation group from a first set of wells that use an organic nano-fluid interfacial tension modifier; and,
providing the second comparison group as a baseline group from a second set of wells that do not use the organic nano-fluid interfacial tension modifier.

16. A system for verifying oil and gas production, comprising:
a network;
a server, connected to the network;
a set of wells connected to the network;
the server programmed to carry out the steps of:
receiving a set of data from the set of wells;
creating a matched data set from the set of data;
generating a set of performance metrics from the matched data set
calculating a probability for each performance metric of the set of performance metrics;
providing a first probability of a first performance metric that indicates whether the first performance metric for a first comparison group is different from the first performance metric for a second comparison group;
wherein the set of data further comprises a set of historical production data for each well of the set of wells, and wherein the step of creating a matched data set further comprises the steps of:
generating a historical production curve from the set of historical production data for each well of the set of wells;
generating a set of predicted production data from the historical production data for each well of the set of wells;
generating a predicted production curve from the set of predicted production data for each well of the set of wells;
matching the predicted production curve with the historical production curve for each well of the set of wells; and,
recalculating the set of predicted production data.

17. The system of claim 16, wherein the server is further programmed to carry out the step of calculating a set of production sums from the matched data set for each well of the set of wells.

* * * * *